Dec. 20, 1938.   J. L. KELLER   2,140,632
CLAMPING DEVICE
Filed March 14, 1938
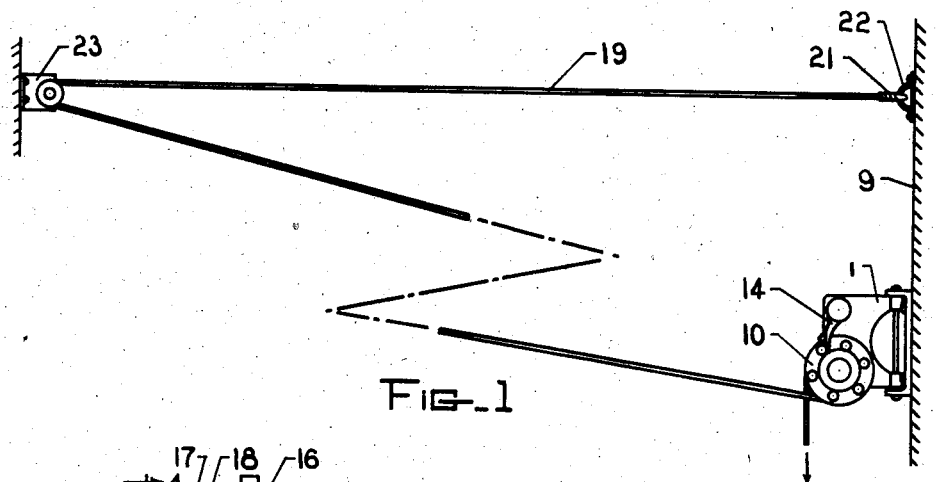
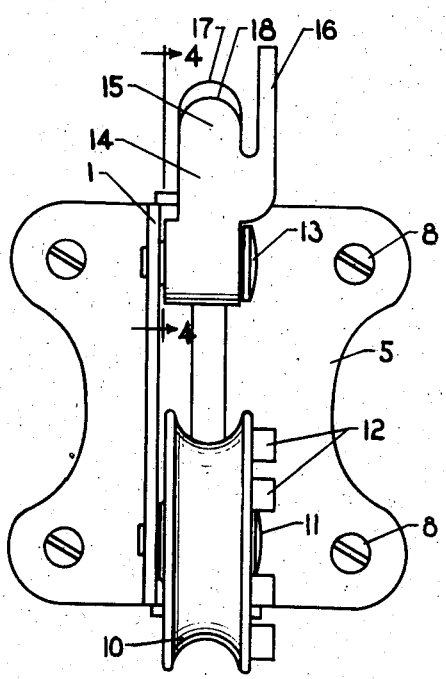
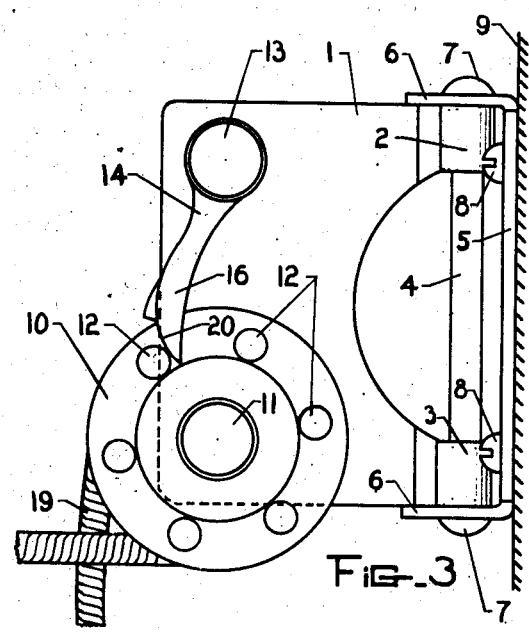
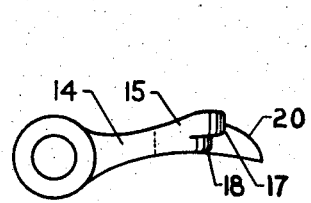
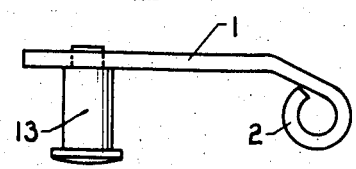
INVENTOR
James L. Keller
BY Roy A. Plant
ATTORNEY Patented Dec. 20, 1938

2,140,632

UNITED STATES PATENT OFFICE 2,140,632

CLAMPING DEVICE

James L. Keller, Ferndale, Mich.

Application March 14, 1938, Serial No. 195,793

6 Claims. (Cl. 188—65.1)

The present invention relates broadly to clamping devices and specifically to a clothes-line gripping mechanism.

On December 2, 1930 U. S. Patent No. 1,783,433 was granted to me for an improved clothes-line support. This improved mechanism utilized, among other things, a circumferentially grooved gear with a gear segment adapted to mesh therewith and having the faces of the leading teeth of the gear segment notched circumferentially progressively to shallower depths. When a clothes-line is passed between this gear and the gear segment, then reverse movement will cause the two to mesh and grip the clothes-line between the teeth so as to hold same tightly against further movement. I have now devised a new mechanism which operates on a new principle, is very simple, eliminates use of the costly gears and gear segments of my prior invention, and is still more positive in action.

Accordingly, among the objects of the present invention is the provision of a grooved pulley having suitably spaced teats on one side thereof, together with a pivoted gripping member having a dog adapted to engage the teats of the pulley and force said gripping member into tighter and tighter contact with a clothes-line or the like in the groove of the pulley when the pulley is rotated with the teats and dog in operative engagement.

Another object is to provide a combination wherein the clothes-line to be gripped will pass around a sufficient portion of the pulley so that friction between the clothes-line and the grooved surface of the pulley will positively cause the pulley to rotate in unison with the movement of the clothes-line, and hence through the engagement of the teats on the pulley by the dog of the gripping member will cause the gripping member to positively grip and hold the clothes-line.

Another object is to provide the dog on the gripping member with a cam face adapted to slideably engage one of the teats on the pulley and hence facilitate the gripping action of the mechanism.

Another object is to mount said pulley and gripping member on a swinging bracket which will enable same to swing to a position in line with the clothes-line.

A further object is to provide a gripping member having a multiple grip edge which facilitates the safe gripping and holding of the clothes-line against endwise movement.

A still further object is to provide a simple, inexpensive, and efficient device whereby a clothes-line, or the like, may be securely held in taut condition and may be readily slackened when it is desired to remove clothes therefrom or take down the line.

Still further objects and advantages will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but one of various ways in which the principle of the invention may be used.

In said annexed drawing:

Fig. 1 is a view in elevation of a clothes-line engaging the improved clamping device.

Fig. 2 is an enlarged front view of the clamping device with the gripper in elevated position.

Fig. 3 is a side elevation of said device with the gripper in gripping position.

Fig. 4 is a view along the line 4—4 of Fig. 2.

Fig. 5 is a top view of the pivoted bracket member with pulley and gripper omitted.

Referring more particularly to the drawing, the device has a pivoted bracket member 1 provided with sleeves 2 and 3 at the mounting edge which journal the bracket member to swing upon a vertical pin 4. The latter is supported upon a plate 5 by means of a pair of lugs 6 projecting from the upper and lower edges of said plate and is suitably secured to said lugs 6, for instance, by riveting heads 7 upon its ends. The plate 5 is attached by means of screws 8, or the like, to a wall 9 or other suitable support.

The bracket 1, as is shown in Fig. 5, is preferably bent near its pivoting edge so that the center line of vertical pin 4 which passes through sleeves 2 and 3 will be approximately in the plane passing through the center of the groove of pulley 10 and perpendicular to the axis thereof. This construction causes bracket 1 to swing to a position such that pulley 10 is directly in line with the clothes-line and adapted to receive same in its groove.

A suitable grooved pulley 10 journaled on a stub shaft 11 is mounted on bracket member 1. The stub shaft 11 may be fastened to bracket member 1 in various ways as by means of threads, or the like. However, a very simple and satisfactory mounting procedure consists of using a stub shaft 11 having a smaller fastening end which may pass through a suitable opening in bracket member 1 and be riveted in place after the pulley 10 has been mounted thereon. A plurality of teats 12 are located on the outer face of said pulley and may be made as an integral part thereof, or separately mounted if desired. A convenient way of forming the pulley with teats is to die cast same substantially to shape with the teats in desired location.

Pivotally mounted on another stub shaft 13 is an arm member 14 which has as parts thereof a gripping tongue 15 and a dog 16. This member with its tongue and dog may be made in various ways, and one of the simplest ways of doing this is to make it in the form of a die casting. The arm member 14 with its gripping tongue 15 is mounted in manner such that it may be swung down to grip a clothes-line, or other suitable flexible member passing around grooved pulley 10. The gripping tongue 15 of arm member 14 preferably has a profile, as viewed in Fig. 2, similar to the groove in pulley 10, but of slightly smaller size. The pulley 10 and gripping tongue 15 may be satisfactorily mounted at various gripping spacings, but one which is normally preferable results when the end of the gripping tongue 15 will just clear the bottom of the groove on pulley 10 when swung thereover. To provide improved holding action with minimized danger of injuring the clothes-line, the gripping tongue 15 may be supplied with a multiple gripping surface such as is shown at 17 and 18.

On the side of arm member 14 and spaced from the gripping tongue 15 is mounted a dog 16. This dog 16 is adapted to engage with the teats 12 on the side of grooved pulley 10. Referring to Fig. 3, the rotation of grooved pulley 10 in a clockwise direction with a clothes-line 19, or the like, thereon will cause a teat 12 to contact dog 16 and positively rotate same in a counter-clockwise direction to force gripping tongue 15 downward into holding position. Providing the dog 16 with a cam face 20, as shown, permits the dog 16 to engage with a teat 12, while leaving ample space between the grooved face of pulley 10 and the end of gripping tongue 15 for the reception of a clothes-line or the like. The use of a cam faced dog also has the advantage that it may be shaped so as to give the teat increased leverage on the dog with corresponding increased gripping power on the clothes-line. With the cam face 20 in engagement with a teat 12, then clockwise rotation of the grooved pulley 10, as shown in Fig. 3, causes cam face 20 of dog 16 to slide on the edge of a teat 12 and force the gripping tongue 15 into tighter and tighter engagement with the clothes-line. On reversal of the pulling of the clothes-line so as to rotate grooved pulley 10 in a counter-clockwise direction, the gripping pressure will be promptly released. To simplify the operation of the mechanism, I prefer to place grooved pulley 10 below arm member 14, as shown, since in this position gravity will cause the dog to engage with the teats and avoid the necessity of hand operation or the use of springs or the like to cause engagement of the dog with the teats.

The operation of the device is as follows: Referring to Fig. 1, a clothes-line 19 may be provided with a hook 21 on its free end adapted to engage an anchor 22 mounted on a wall 9 or other suitable support. The clothes-line 19 may pass directly to the clamping mechanism of the present invention, but normally it is desirable to stretch the clothes-line back and forth over a given area and use the clamping mechanism at the end of the last course. In such case, a suitable pulley 23, or the like, may be used at the turns of the clothes-line. In using a clamping device of the specific type shown, the clothes-line is passed under and around the pulley 10 and pulled in the direction of the arrow until sufficient tension is attained. Releasing the tension on the end of the clothes-line causes pulley 10 to rotate in a clockwise direction and a teat 12 to engage with cam face 20 of dog 16 to force the gripping surface of gripping tongue 15 into holding contact with the clothes-line. It is to be noted that with this construction, the greater the load on the clothes-line, the tighter will be the gripping action on same, and this is facilitated by friction between the clothes-line 19 and the face of grooved pulley 10 which forces the pulley to rotate in unison with lengthwise movement of the clothes-line, and in doing so makes the operation of the dog 16 and gripping tongue 15 positive.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a clamping device of the character described, the combination which comprises a pivotally mounted arm member having a gripping tongue and a dog, a grooved pulley having means thereon adapted to engage the dog of said pivotally mounted arm member, said dog and means on the pulley cooperating so that upon rotation of the pulley with said dog and means in operative engagement the gripping tongue of the pivotally mounted arm member will be brought into gripping relation in the groove of said pulley.

2. In a clamping device of the character described, the combination which includes a grooved pulley having suitably spaced teats projecting from a side face thereof, a pivotally mounted arm member having a gripping tongue and a dog, said dog being adapted to operatively engage with one of said teats on said pulley such that the rotation of said pulley with a teat in operative contact with said dog will bring said gripping tongue into gripping relation in the groove of said pulley.

3. In a device of the character described, the combination of a support, an arm member pivotally mounted on said support, said arm member having as parts thereof a gripping tongue and a dog, a grooved pulley separately mounted on said support, said pulley having means on one side face adapted to engage said dog and positively swing said arm member simultaneously with the rotation of said pulley, the gripping tongue of said arm member and the groove of said pulley being so constructed and arranged that upon gripping direction rotation of the arm member and pulley through engagement of the dog with a teat, the gripping tongue is adapted to grip a clothes-line or the like in the groove of said pulley.

4. In a clamping device of the character described, the combination of a mounting plate, a bracket member pivotally mounted thereon, an arm member and a grooved pulley separately mounted on said bracket, said arm member carrying a gripping tongue and a dog, said pulley having means on its side edge for engaging said dog and upon rotation of the pulley with the dog in operative contact with said means on the pulley to force the gripping tongue of the arm member into gripping relation in the groove of said pulley.

5. In a clamping device of the character described, the combination of a mounting plate, a bracket member pivotally mounted thereon, an arm member and a grooved pulley separately mounted on said bracket, said arm member carrying a dog and a gripping tongue having a multiple gripping surface, said pulley having a plurality of teats on one side edge for engaging said dog and upon rotation of the pulley with the dog in contact with one of said teats to force the gripping tongue of the arm member into gripping relation in the groove of said pulley.

6. In a clamping device of the character described, the combination of a mounting plate, a bracket member, a pivot means for pivotally mounting said bracket member on said mounting plate, an arm member pivotally mounted on said bracket, and a grooved pulley pivotally mounted on said bracket, said arm member carrying a gripping tongue and a dog, said pulley having means on one side edge adjacent the outer periphery thereof for engaging said dog and upon rotation of the pulley with the dog in operative contact with said means on the pulley, to force the gripping tongue of the arm member into gripping relation in the groove of said pulley, said bracket member being constructed so that its pivot center line will be approximately in a plane passing through the center of the groove of the pulley and perpendicular to the axis thereof.

JAMES L. KELLER.